(12) United States Patent
Karlsson et al.

(10) Patent No.: US 8,984,264 B2
(45) Date of Patent: Mar. 17, 2015

(54) PRECISE DATA RETURN HANDLING IN SPECULATIVE PROCESSORS

(75) Inventors: Martin R. Karlsson, San Francisco, CA (US); Sherman H. Yip, San Francisco, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1029 days.

(21) Appl. No.: 12/688,679

(22) Filed: Jan. 15, 2010

(65) Prior Publication Data

US 2011/0179258 A1 Jul. 21, 2011

(51) Int. Cl.
*G06F 15/00* (2006.01)
*G06F 7/38* (2006.01)
*G06F 9/00* (2006.01)
*G06F 9/44* (2006.01)
*G06F 12/08* (2006.01)
*G06F 9/38* (2006.01)
*G06F 9/30* (2006.01)

(52) U.S. Cl.
CPC .......... *G06F 12/0859* (2013.01); *G06F 9/3836* (2013.01); *G06F 9/3842* (2013.01); *G06F 9/3863* (2013.01); *G06F 9/30189* (2013.01); *G06F 9/383* (2013.01); *G06F 9/3857* (2013.01)
USPC .......................................... 712/229; 712/216

(58) Field of Classification Search
None
See application file for complete search history.

(56) References Cited

U.S. PATENT DOCUMENTS

| 7,055,021 | B2 * | 5/2006 | Kadambi | 712/217 |
|---|---|---|---|---|
| 7,529,911 | B1 * | 5/2009 | Spracklen et al. | 712/207 |
| 8,019,983 | B1 * | 9/2011 | Rozas et al. | 712/244 |
| 2005/0251664 | A1 * | 11/2005 | Caprioli et al. | 712/228 |
| 2007/0198778 | A1 * | 8/2007 | Chaudhry et al. | 711/122 |
| 2008/0189531 | A1 * | 8/2008 | Chaudhry et al. | 712/227 |
| 2009/0024838 | A1 * | 1/2009 | Dhodapkar et al. | 712/214 |
| 2010/0332901 | A1 * | 12/2010 | Nussbaum et al. | 714/16 |

* cited by examiner

*Primary Examiner* — Andrew Caldwell
*Assistant Examiner* — George Giroux
(74) *Attorney, Agent, or Firm* — Park, Vaughan, Fleming & Dowler LLP; Anthony P. Jones

(57) ABSTRACT

The described embodiments provide a system for executing instructions in a processor. In the described embodiments, upon detecting a return of input data for a deferred instruction while executing instructions in an execute-ahead mode, the processor determines whether a replay bit is set in a corresponding entry for the returned input data in a miss buffer. If the replay bit is set, the processor transitions to a deferred-execution mode to execute deferred instructions. Otherwise, the processor continues to execute instructions in the execute-ahead mode.

20 Claims, 5 Drawing Sheets

PRECISE DATA RETURN HANDLING IN SPECULATIVE PROCESSORS

BACKGROUND

1. Field

The described embodiments relate to microprocessors. More specifically, the described embodiments relate to precise data return handling in speculative processors.

2. Related Art

Some modern microprocessors facilitate deferred execution of instructions with unavailable operands. In these processors, if an instruction is ready for execution before all of its operands are available, the processor can place the instruction in a deferred buffer, thereby "deferring" the instruction, and can speculatively execute subsequent non-dependent instructions. While speculatively executing the subsequent instructions, any instruction with unavailable operands is similarly placed in the deferred buffer in program order (including instructions with dependencies on results of instructions which are already in the deferred buffer).

When the operands for a deferred instruction eventually become available, the processor enters a "deferred-execution mode," during which the processor issues deferred instructions from the deferred buffer in program order for execution. In the deferred-execution mode, any instructions for which all operands are available are executed, but instructions with unavailable operands are placed back into the deferred buffer in program order, thereby "re-deferring" these instructions. In these processors, when each operand becomes available, if there are instructions in the deferred buffer, the processor makes a pass through the deferred buffer in deferred mode to attempt to execute any dependent deferred instructions.

Because the processor makes a pass through the deferred buffer as each operand becomes available, in some cases inefficiencies can arise. For example, assume that:

1. Cache line a, which contains input data for instruction A, is not in the processor's data cache when the processor attempts to execute instruction A, and so the processor defers instruction A and sends a request to the memory system for cache line a.
2. Cache line b, which contains input data for instruction B is not in the processor's data cache when the processor attempts to execute instruction B, and so the processor defers instruction B and sends a request to the memory system for cache line b.
3. Numerous additional instructions that are unrelated to instructions A or B are also deferred because input data is not available for these instructions.

When cache line a eventually returns from the memory system, the processor enters the deferred-execution mode and begins to issue the deferred instructions from the deferred buffer for execution. Assuming that cache line b returns after the processor starts execution in the deferred-execution mode, but before the processor executes instruction B, because both cache line a and cache line b are then available, the processor can execute both instructions A and B.

Because cache line b returned after the processor started in the deferred-execution mode, upon completing the pass through the deferred buffer, the processor automatically starts a second, separate pass through the deferred buffer in the deferred-execution mode to attempt to execute instructions that are dependent on cache line b. However, as described above, the processor was able to execute instruction B in the first pass through the deferred buffer in deferred-execution mode. Thus, the subsequent pass through the deferred buffer triggered by the return of cache line b unnecessarily employs the processor's computational resources, preventing the resources from being used to perform useful computational work.

SUMMARY

The described embodiments provide a system for executing instructions in a processor (such as processor 102 in FIG. 1). In the described embodiments, upon detecting a return of input data for a deferred instruction while executing instructions in an execute-ahead mode, the processor determines whether a replay bit is set in a corresponding entry for the returned input data in a miss buffer. If the replay bit is set, the processor transitions to a deferred-execution mode to execute deferred instructions. Otherwise, the processor continues to execute instructions in the execute-ahead mode.

In the described embodiments, when executing instructions in the execute-ahead mode, the processor is configured to place instructions that cannot be executed due to an unresolved data dependency into a deferred buffer, thereby deferring the instructions, and execute other non-deferred instructions in program order.

In the described embodiments, when deferring an instruction for which a memory access is used to resolve the unresolved data dependency and for which a record of the memory access is kept in the miss buffer, the processor is configured to send a request to a memory system for the data to resolve the unresolved data dependency. The processor then records the request in a corresponding entry in the miss buffer and sets a replay bit in the entry in the miss buffer.

In the described embodiments, when executing instructions in the deferred-execution mode, the processor is configured to issue deferred instructions from the deferred buffer for execution in program order. The processor is further configured to place deferred instructions that still cannot be executed due to an unresolved data dependency back into the deferred buffer, thereby re-deferring the instructions and executing other deferred instructions in program order.

In the described embodiments, the processor is configured to clear the replay bit for each entry in the miss buffer when transitioning to the deferred-execution mode.

In some embodiments, when re-deferring an instruction with a corresponding entry in the miss buffer, the processor is configured to set a replay bit in the entry in the miss buffer.

In some embodiments, the input data is a cache line and the corresponding miss request buffer is a cache miss buffer, and the processor is configured to check the cache miss buffer to determine whether the replay bit is set for an entry for a corresponding cache line request in the cache miss buffer.

In some embodiments, the input data is a page entry and the corresponding miss request buffer is a data translation lookaside buffer (DTLB) miss buffer, and the processor is configured to check the DTLB miss buffer to determine whether the replay bit is set for a corresponding page entry request in the DTLB miss buffer.

Figure 1:
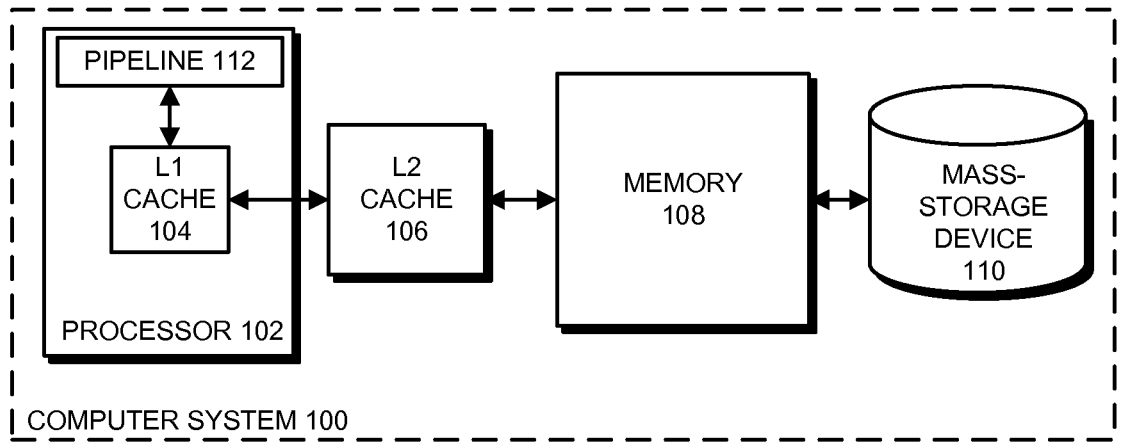
FIG. 1 presents a block diagram of a computer system in accordance with the described embodiments.

In the figures, matching reference numerals refer to the same figure elements.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. For example, computer-readable storage media can include, but are not limited to, volatile memory and non-volatile memory, such as magnetic and optical storage devices such as disk drives, magnetic tape, CDs (compact discs), DVDs (digital versatile discs), or other media capable of storing data structures or code.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Overview

In the described embodiments, upon determining that a previously unresolved data dependency has been resolved, but before starting a deferred-execution mode episode (i.e., before making a pass through the deferred buffer 208 (see FIG. 2) in deferred-execution mode 606 (see FIG. 6) to execute deferred instructions), processor 102 (see FIG. 1) determines whether a replay bit for the returned data indicates that a deferred-execution mode episode will encounter any instructions in the deferred buffer that are dependent on the returned data. If the replay bit is clear (e.g., set to 0), processor 102 does not enter the deferred-execution mode 606, but instead continues executing in execute-ahead mode 604.

In the described embodiments, all of processor 102's replay bits are cleared upon starting a deferred-execution mode episode, and each replay bit is only reasserted (i.e., set to "1") if a corresponding instruction is re-deferred during the deferred-execution mode episode. By clearing and re-setting the replay bits in this way, processor 102 keeps track of deferred instructions which, based on data returned during a deferred-execution mode episode, were able to be executed (as these instructions will not have their replay bit(s) set). This can obviate unnecessary deferred-execution mode episodes in these embodiments.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104 and pipeline 112.

Processor 102 can include any device that is configured to perform computational operations. For example, processor 102 can be a central processing unit (CPU) such as a microprocessor. As another example, processor 102 can be a controller or an application-specific integrated circuit.

Mass-storage device 110, memory 108, L2 cache 106, and L1 cache 104 are computer-readable storage media that collectively form a memory hierarchy in a memory subsystem that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. For example, memory 108 can be a dynamic random access memory (DRAM) structure that is larger than L1 cache 104 and L2 cache 106, whereas L1 cache 104 and L2 cache 106 can include smaller static random access memories (SRAMs). In some embodiments, L2 cache 106, memory 108, and mass-storage device 110 are shared among one or more processors in computer system 100. In addition, in some embodiments, L1 cache 104 comprises two separate caches, an instruction cache and a data cache (see, e.g., D-cache 306 in FIG. 3), for separately storing cache lines containing instructions and data, respectively. Such memory structures are well-known in the art and are therefore not described in more detail.

Computer system 100 can be incorporated into many different types of electronic devices. For example, computer system 100 can be part of a desktop computer, a laptop computer, a server, a media player, an appliance, a cellular phone, a piece of testing equipment, a network appliance, a calculator, a personal digital assistant (PDA), a hybrid device (i.e., a "smart phone"), a guidance system, a toy, audio/video electronics, a video game system, a control system (e.g., an automotive control system), or another electronic device.

Although we use specific components to describe computer system 100, in alternative embodiments, different components can be present in computer system 100. For example, computer system 100 can include video cards, network cards, optical drives, network controllers, I/O devices, and/or other peripheral devices that are coupled to processor 102 using a bus, a network, or another suitable communication channel. Alternatively, computer system 100 may include more or fewer of the elements shown in FIG. 1. For example, computer system 100 may include additional processors 102, and the processors 102 may share some or all of L2 cache 106, memory 108, and mass-storage device 110 and/or may include some or all of their own memory hierarchy.

Figure 2:
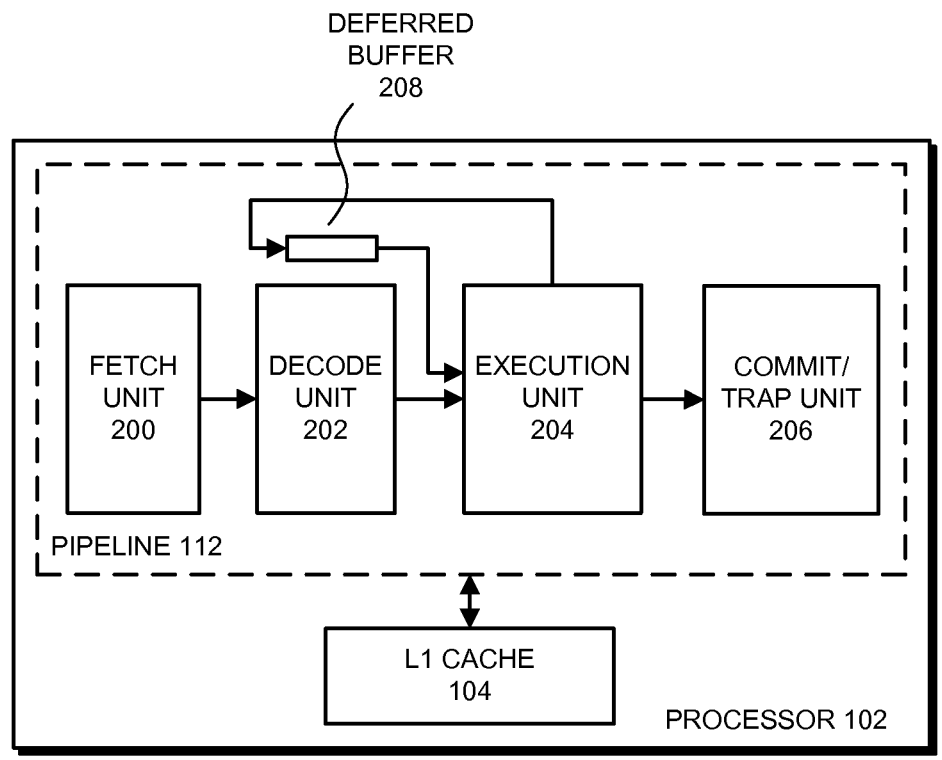
FIG. 2 presents a block diagram of a processor in accordance with the described embodiments.

FIG. 2 presents a block diagram of processor 102 in accordance with the described embodiments. As shown in FIG. 2, processor 102 includes pipeline 112. Generally, pipeline 112 is an instruction execution pipeline that includes a number of stages for executing program code. The stages in pipeline 112 are coupled in series, with the output of a given stage coupled to the input of a next stage. In the described embodiments, instructions progress through each stage of the pipeline to complete a corresponding part of executing the instruction.

Pipeline 112 includes fetch unit 200, decode unit 202, execution unit 204, and commit/trap unit 206. Fetch unit 200 fetches instructions from L1 cache 104 (or, if necessary, from other levels of the memory hierarchy) for execution. Next, decode unit 202 decodes the fetched instructions and prepares the instructions for execution by execution unit 204. Execution unit 204 then executes the instructions forwarded from decode unit 202. Execution unit 204 can include one or more floating point execution units, integer execution units, branch execution units, and/or memory execution units (e.g., load/store execution units) for executing the instructions. Commit/trap unit 206 retires successfully executed instructions (i.e., commits the results to the architectural state of processor 102 and computer system 100) and handles traps/errors that arise during the execution of instructions.

Pipeline 112 also includes deferred buffer 208. In the described embodiments, if an instruction cannot be executed due to an unresolved data dependency, such as an operand that has not returned from a load operation or a translation lookaside buffer miss, processor 102 defers execution of the instruction and places the instruction into deferred buffer 208. In other words, because the instruction with the unresolved dependency cannot yet be executed by execution unit 204 due to the unresolved data dependency, the instruction is forwarded from execution unit 204 along the path shown in FIG. 2 to deferred buffer 208. When the data dependency is eventually resolved, instructions from deferred buffer 208 are executed in program order with respect to other deferred instructions, but not with respect to other previously executed non-deferred instructions. This process is described in more detail below with reference to FIG. 6.

Note that pipeline 112 is simplified for the purposes of illustration. In alternative embodiments, pipeline 112 can contain other stages (units), functional blocks, mechanisms, and/or circuits. The units, functional blocks, mechanisms, and/or circuits that can be used in a pipeline are known in the art and hence are not described in detail.

In some embodiments, processor 102 includes a checkpoint-generation mechanism (not shown). This checkpoint-generation mechanism includes one or more register files, memories, tables, lists, or other structures that facilitate saving a copy of the architectural state of processor 102. In these embodiments, when commencing speculative execution (e.g., execution in execute-ahead mode 604), the checkpoint-generation mechanism can perform operations to checkpoint the architectural state of processor 102. Generally, the architectural state includes copies of all structures, memories, registers, flags, variables, counters, etc. that are useful or necessary for restarting processor 102 from the pre-speculation architectural state. Note that the checkpoint-generation mechanism may not immediately copy values to preserve the pre-speculation architectural state. In some embodiments, the state is only preserved as necessary. For example, before a register, counter, variable, etc. is overwritten or changed during speculative execution, the checkpoint-generation mechanism can preserve a copy. In some embodiments, the checkpoint-generation mechanism is distributed among one or more of the sub-blocks of processor 102.

Figure 6:
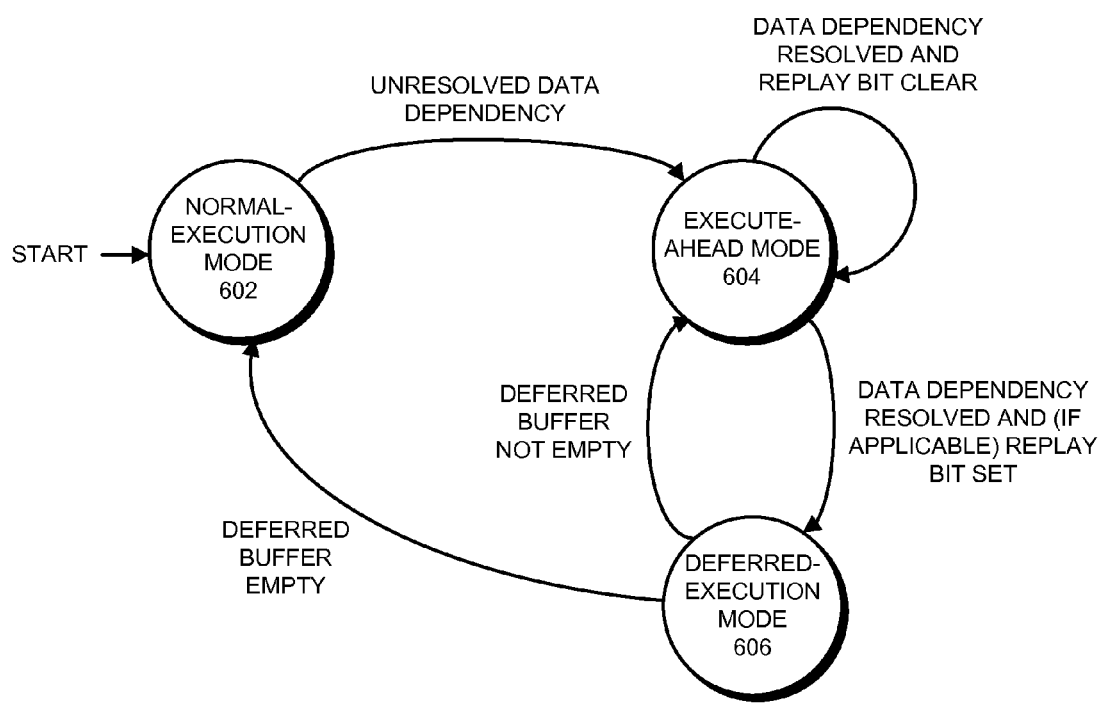
FIG. 6 presents a state diagram which includes a normal-execution mode, an execute-ahead mode, and a deferred-execution mode in accordance with the described embodiments.

Computer system 100 also includes mechanisms (functional blocks, circuits, etc.) for operating in an execute-ahead mode 604 and a deferred-execution mode 606 (see FIG. 6). Exemplary embodiments of a system that supports an execute-ahead mode and a deferred-execution mode are described in U.S. Pat. No. 7,114,060, entitled "Selectively Deferring Instructions Issued in Program Order Utilizing a Checkpoint and Multiple Deferral Scheme," by inventors Shailender Chaudhry and Marc Tremblay, which is hereby incorporated by reference to describe the mechanisms and processes of operating in execute-ahead mode and deferred-execution mode. Note that, although we provide this reference as an example of a system that supports execute-ahead mode and deferred-execution mode, numerous other references describe additional aspects of the execute-ahead mode and the deferred-execution mode. See, for example, U.S. Pat. No. 7,293,161, entitled "Deferring Loads and Stores When a Load Buffer or Store Buffer Fills during Execute-Ahead Mode," by inventors Shailender Chaudhry, Marc Tremblay, and Paul Caprioli, or U.S. Pat. No. 7,487,335, entitled "Method and Apparatus for Accessing Registers during Deferred Execution," by inventors Shailender Chaudhry, Syed I. Haq, Mohammed M. Rahman, and Khanh Luu, along with other publications, conference papers, patent publications, and issued patents.

Figure 3:
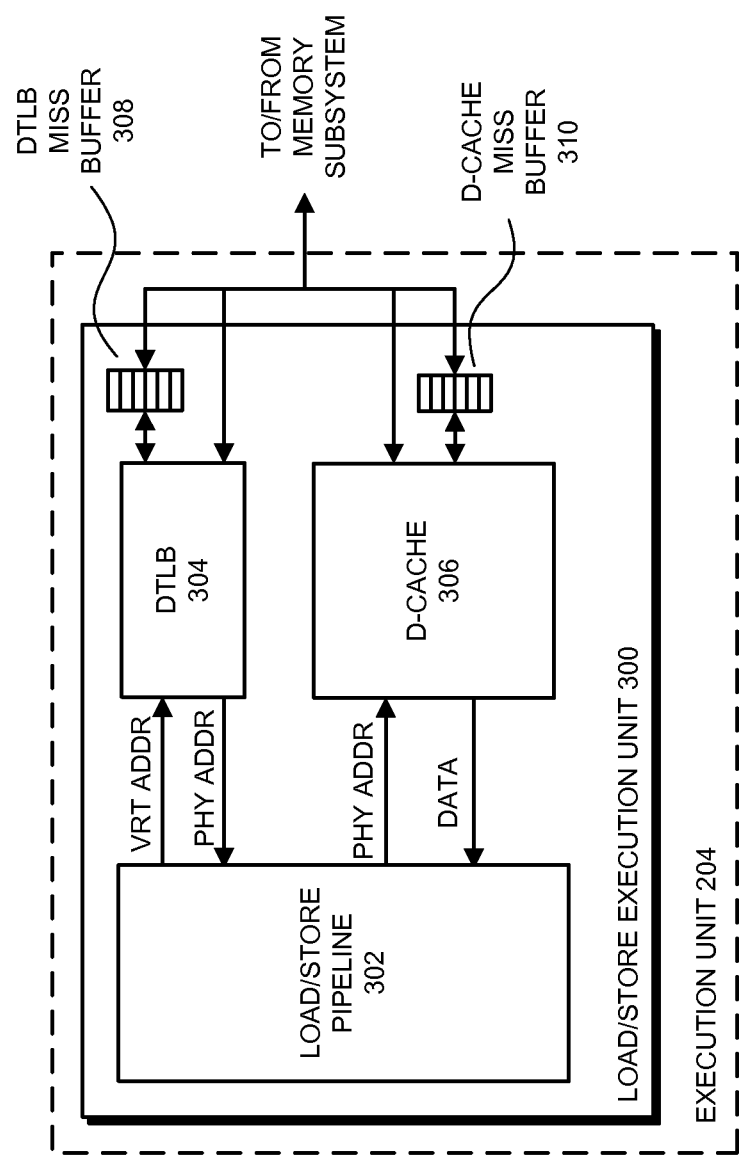
FIG. 3 presents a block diagram of an execution unit in accordance with the described embodiments.

FIG. 3 presents an exemplary execution unit 204 in processor 102 in accordance with the described embodiments. Execution unit 204 includes load/store execution unit 300. Load/store execution unit 300 includes load/store pipeline 302, data translation lookaside buffer (DTLB) 304, data cache (D-cache) 306, DTLB miss buffer 308, and D-cache miss buffer 310.

Note that the embodiment of load/store execution unit 300 shown in FIG. 3 is simplified for the purposes of illustration. Alternative embodiments include additional mechanisms (i.e., functional blocks, circuits, or hardware) for loading/storing data and/or handling memory operations. These mechanisms are known in the art and hence are not described in detail. In addition, as described above, in alternative embodiments execution unit 204 includes more and/or different execution units (e.g., floating point execution units, integer execution units, branch execution units, etc.).

Load/store execution unit 300 is used for executing memory loads and stores in pipeline 112. During operation, instructions that load data from memory (collectively "load instructions") or store data to memory (collectively "store instructions") are forwarded from decode unit 202 to load/store execution unit 300 to be executed to load values from/store values to data cache 306 (or from higher levels in the memory hierarchy). When load/store execution unit 300 executes a store instruction, the data is retrieved from a corresponding processor register (not shown) and stored to a cache line in D-cache 306 indicated by the load instruction. When load/store execution unit 300 executes a load instruction, the data is retrieved from a corresponding cache line in D-cache 306 and loaded into the processor register indicated by the load instruction. The loaded data can then be retrieved by an execution unit and used for executing subsequent instructions.

Load/store pipeline 302 is an instruction execution pipeline that is used for executing loads and stores in load/store execution unit 300. Generally, load/store pipeline 302 includes a number of stages (not shown) coupled in series. Each of these stages is used to perform part of executing the load or store instructions. For example, one stage in load/store pipeline 302 can be used for accessing DTLB 304 for translating a virtual address to a physical address, and another stage of load/store pipeline 302 can be used for accessing a cache line in D-cache 306 using the physical address. Load/store pipelines are known in the art and hence are not described in detail.

DTLB 304 is a lookup structure used by load/store execution unit 300 for translating virtual addresses of cache lines of data into the physical addresses where the cache lines are actually located in memory. DTLB 304 has a number of slots that contain page table entries that map virtual addresses to physical addresses. In some embodiments DTLB 304 is a content-addressable memory (CAM), in which the search key is the virtual address and the search result is a physical address. Generally, if a requested virtual address is present in DTLB 304 (a "DTLB hit"), DTLB 304 provides the corresponding physical address, which is then used to attempt to fetch the cache line from D-cache 306. Otherwise, if the virtual address is not present in DTLB 304 (a "DTLB miss"), in some embodiments, processor 102/DTLB 304 requests the page entry from one or more higher levels of DTLB (not shown). If the translation is not present in the DTLB (and, if used, any higher-level DTLB), the translation can be performed using a high-latency "page walk," which involves computing the physical address using one or more values retrieved from the memory subsystem. (Note that virtual addresses and physical addresses and their respective uses are known in the art and hence are not described in detail.)

DTLB miss buffer 308 is a memory that includes a number of entries for recording DTLB misses. In the described embodiments, when a virtual address lookup misses in DTLB 304, a request is sent to the higher-level DTLBs and/or the memory subsystem to perform a page walk, and the outstanding request is recorded in an entry in DTLB miss buffer 308. When a physical address is returned in response to the outstanding request, DTLB 304 can be updated and the corresponding entry in the DTLB miss buffer 308 can be cleared or invalidated. In addition, as described below, depending on whether a replay bit 406 (see FIG. 4) is set in the entry in DTLB 304, a deferred-execution mode episode can be started by processor 102.

D-cache 306 is a cache memory that stores a number of cache lines containing data. Generally, a request for a given cache line address can be sent to D-cache 306 to perform a lookup for the cache line. If the cache line is present in D-cache 306 (a "hit"), the cache line can be accessed in D-cache 306 (e.g., loaded from or stored to) in accordance with a coherency protocol in force in the memory subsystem. Otherwise, if the cache line is not present in D-cache 306 (a "miss"), the request can be forwarded to the next level in the memory subsystem so that the cache line can be placed in D-cache 306 and subsequently accessed.

D-cache miss buffer 310 is a memory that includes a number of entries for recording D-cache misses. In the described embodiments, when a lookup for a cache line misses in D-cache 306, a request is sent to the memory subsystem for the cache line and the request is recorded in an entry in D-cache miss buffer 310. When a cache line is returned in response to an outstanding request, D-cache 306 can be updated and the entry in the D-cache miss buffer 310 can be cleared or invalidated. In addition, as described below, depending on whether a replay bit 506 (see FIG. 5) is set in the entry in D-cache miss buffer 310, a deferred-execution mode episode can be started by processor 102.

Figure 4:
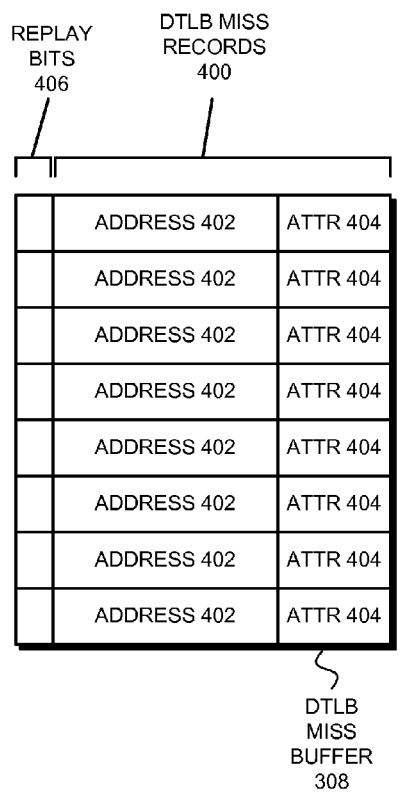
FIG. 4 presents a block diagram of a data translation lookaside buffer (DTLB) miss buffer in accordance with the described embodiments.

FIG. 4 presents an expanded view of DTLB miss buffer 308 in accordance with the described embodiments. As described above, DTLB miss buffer 308 is used to keep track of DTLB translation requests for which the translation was not present in DTLB 304 (a DTLB miss), and hence a request was forwarded to higher-level DTLBs and/or the memory system. Accordingly, DTLB miss buffer 308 includes a number of entries that each include a DTLB miss record 400 and a replay bit 406. Each DTLB miss record 400 includes an address 402 that identifies the miss/request along with a set of one or more attribute (ATTR) bits 404 that provide information about the entry (e.g., whether the entry is presently valid, whether a deferred instruction depends on the entry, etc.). The replay bit 406 in each entry is used to determine when a DTLB translation that is returned from either the higher-level DTLB or the memory subsystem should cause processor 102 to start a deferred-execution mode episode.

Figure 5:
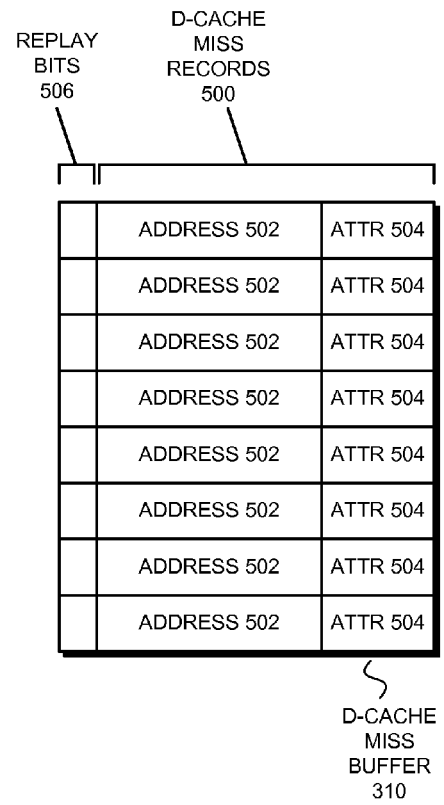
FIG. 5 presents a block diagram of a data cache miss buffer in accordance with the described embodiments.

FIG. 5 presents an expanded view of D-cache miss buffer 310 in accordance with the described embodiments. As described above, D-cache miss buffer 310 is used to keep track of cache line requests to D-cache 306 for which the cache line was not present in D-cache 306 (a D-cache miss), and hence a request for the cache line was forwarded to the memory subsystem. Accordingly, D-cache miss buffer 310 includes a number of entries that each include a D-cache miss record 500 and a replay bit 506. Each D-cache miss record 500 includes an address 502 that identifies the miss/request along with a set of one or more attribute (ATTR) bits 504 that provide information about the entry (e.g., whether the entry is presently valid, whether a deferred instruction depends on the entry, etc.). The replay bit 506 in each entry is used to determine when a cache line that is returned in response to a request to the memory subsystem should cause processor 102 to start a deferred-execution mode episode.

Note that, although we show the DTLB miss buffer 308 and D-cache miss buffer 310 with particular entry formats, in alternative embodiments, one or both of the miss buffers may have different entry formats. For example, one or both of the miss buffers may include more or fewer fields in each entry. Generally, the entries in the miss buffers each include sufficient fields to keep records of outstanding requests for data following corresponding misses.

In addition, in the following description for clarity and brevity, we may refer to DTLB miss buffer 308 and D-cache miss buffer 310 collectively as "the miss buffers."

Moreover, in some embodiments, processor 102 includes one or more additional miss data structures that include one or more entries that can each contain a reference to a load miss. For example, processor 102 can include a load annex that is used to keep a record of certain types of load operations that have missed in D-cache 306.

Execute-Ahead Mode and Deferred-Execution Mode

FIG. 6 presents a state diagram which includes a normal-execution mode 602, an execute-ahead mode 604, and a deferred-execution mode 606 in accordance with the described embodiments. Generally, the described embodiments can operate in execute-ahead mode 604 or deferred-execution mode 606 to speculatively execute program code following a stall condition in normal-execution mode 602. Using speculative execution, these embodiments can perform useful computational work in cases where some existing processors are stalled waiting for data dependencies to be resolved so that dependent instructions can be executed.

As shown in FIG. 6, processor 102 initially executes program code in normal-execution mode 602. In normal-execution mode 602, processor 102 executes instructions from program code in program order and commits results from executing instructions to the architectural state of processor 102.

Upon encountering an unresolved data dependency during execution of an instruction in normal-execution mode 602, processor 102 transitions to execute-ahead mode 604. In the described embodiments, an unresolved data dependency can include, but is not limited to: (1) a use of an operand that has not returned from a preceding load miss (e.g., a D-cache miss); (2) a use of an operand that has not returned from a preceding data translation lookaside buffer (DTLB) miss; (3) a use of an operand that has not returned from a preceding full or partial read-after-write (RAW) from store buffer operation; and (4) a use of a result from a prior instruction (as an operand) that was subject to an unresolved data dependency.

When transitioning to execute-ahead mode 604, processor 102 generates a checkpoint that can be used to restore a pre-speculation architectural state to processor 102. (As described above, generating the checkpoint involves preserving the precise architectural state of processor 102 to facilitate subsequent recovery should a need to return to the pre-speculation state arise during execute-ahead mode 604 or deferred-execution mode 606.)

In addition, because the instruction with the unresolved data dependency cannot be executed until the data dependency is resolved, execution unit 204 forwards the instruction to deferred buffer 208. The instruction is then stored in deferred buffer 208 until the data dependency is resolved. (We call this operation "deferring" the instruction and refer to such an instruction as a "deferred instruction.")

By deferring the instruction with the unresolved data dependency, processor 102 frees execution unit 204 to speculatively execute subsequent non-dependent instructions. Hence, in execute-ahead mode 604, processor 102 continues to execute subsequent instructions in program order. While executing subsequent instructions, any instructions that cannot be executed because of an unresolved data dependency or a dependency on a result of a prior deferred instruction are not executed, but are instead also deferred and placed in deferred buffer 208.

As described above, two potential sources of unresolved data dependencies are data cache misses and DTLB misses. In the described embodiments, upon encountering a data cache miss or a DTLB miss for an instruction, in addition to deferring the instruction, processor 102 sends the request for the cache line or DTLB translation and records the miss in D-cache miss buffer 310 or DTLB miss buffer 308, respectively. Processor 102 also sets one or more attribute bits (i.e., one or more of attribute bits 404 in DTLB miss buffer 308 or attribute bits 504 in D-cache miss buffer 310) in the entry to indicate that a deferred instruction depends on the entry. In addition, processor 102 sets a replay bit (i.e., replay bit 406 in DTLB miss buffer 308 or replay bit 506 in D-cache miss buffer 310) for the entry. By setting the one or more attribute bits and the replay bit, processor 102 records that a deferred-execution mode episode (i.e., a pass through deferred buffer 208 in deferred-execution mode 606, as described below) should be started when data returns for the corresponding request.

While operating in execute-ahead mode 604, processor 102 monitors for the return of data in response to a request for a data cache line or a request for a DTLB translation. When data returns, load/store execution unit 300 determines whether the attribute bits in a corresponding entry in the associated miss buffer indicate that a deferred instruction depends on the returned data. If so, load/store execution unit 300 checks the replay bit associated with the entry to determine whether a deferred-execution mode episode should be started.

Note that processor 102 also monitors for other types of data returns to start deferred-execution mode episodes (e.g., data forwarded from a store buffer, etc.). However, in some embodiments, the deferred-execution mode episodes caused by such data returns are not dependent on the state of a replay bit (i.e., the data returns do not cause processor 102 to determine whether a replay bit is set and conditionally start the deferred-execution mode episode). For deferred-execution mode episodes the start of which is not dependent on the state of a replay bit, processor 102 simply transitions to deferred-execution mode 606 to start a deferred-execution mode episode as described below.

If the replay bit is clear/not set, processor 102 remains in execute-ahead mode 604 and continues speculatively executing instructions. Note that this operation is different than existing systems that support execute-ahead mode 604 and deferred-execution mode 606, because in existing systems a deferred-execution mode episode is always started when data returns. Note that although the deferred-execution mode episode is always "started," in some embodiments, processor 102 can terminate the deferred-execution mode episode before making the pass through the deferred queue if one or more predetermined conditions have occurred. For example, in some embodiments, processor 102 can keep a record of data requests (e.g., load misses, etc.) for which the execution of the instruction was terminated (e.g., pipe-cleared away), and can halt the deferred-execution mode episode before making a pass through the deferred queue for such data returns. As described in more detail below, preventing a deferred-execution mode episode in this way can enable processor 102 to avoid performing unnecessary deferred-execution mode episodes.

On the other hand, if the replay bit is set (or for data returns that are not dependent on a replay bit), processor 102 transitions to the deferred-execution mode 606. Before starting to execute instructions in deferred-execution mode 606, processor 102 clears all of the replay bits in both DTLB miss buffer 308 and D-cache miss buffer 310. Clearing the replay bits enables processor 102 to reset the replay bit(s) for instructions that are subsequently re-deferred during the deferred-execution mode episode. The reset replay bits 406 can then be used by processor 102 to determine which data returns should trigger deferred-execution mode episodes.

In deferred-execution mode 606, processor 102 attempts to execute deferred instructions from deferred buffer 208 in program order. Processor 102 attempts to execute these instructions in program order with respect to other deferred instructions in deferred buffer 208 (i.e., deferred buffer 208 is a first-in-first-out buffer), but not with respect to other previously executed non-deferred instructions (and not with respect to deferred instructions executed in previous passes through deferred buffer 208). More specifically, during a deferred-execution mode episode, processor 102 issues each instruction from deferred buffer 208 to execution unit 204 in the order in which they were stored in deferred buffer 208. Note that, while issuing instructions from deferred buffer 208, processor 102 prevents the front end of pipeline 112 (i.e., instruction fetch unit 200 and instruction decode unit 202) from forwarding instructions to instruction execution unit 204 so that the only instructions executed by execution unit 204 during the deferred-execution mode 606 are issued from deferred buffer 208.

While attempting to execute each instruction from deferred buffer 208 in deferred-execution mode 606, upon encountering an instruction for which the data dependency has not yet been resolved, processor 102 re-defers execution and places the re-deferred instruction back into deferred buffer 208. (Note that processor 102 executes the other instructions that can be executed in program order with respect to each other.)

When re-deferring an instruction, processor 102 also sets the replay bit for the corresponding entry in the associated miss buffer. For example, if processor 102 attempts to execute a previously deferred load instruction that again misses in D-cache 306, processor 102 updates the replay bit for the entry in D-cache miss buffer 310 from "0" to "1."

Recall that, at the beginning of the deferred-execution mode episode, the replay bits for all the entries in the miss buffers were cleared. By setting the replay bit for the corresponding entry in the associated miss buffer when re-deferring an instruction, processor 102 records that the entry in the miss buffer is associated with an instruction that has been re-deferred and hence should be re-executed in a subsequent deferred-execution mode episode. Because the replay bit has been set, a subsequent data return for the entry causes a deferred-execution mode episode to be started.

After the system completes a pass through deferred buffer 208, if deferred buffer 208 is empty, the system moves back into normal-execution mode 602. This may involve committing changes made during execute-ahead mode 604 and deferred-execution mode 606 to the architectural state of the processor, if such changes have not been already committed. It can also involve deleting the checkpoint generated when the system moved into execute-ahead mode 604.

On the other hand, if deferred buffer 208 is not empty after the system completes a pass through deferred buffer 208, the system returns to execute-ahead mode 604 to execute instructions from the point where the execute-ahead mode 604 left off (i.e., processor 102 resumes fetching and executing instructions from the last instruction executed in execute-ahead mode 604 before the deferred-execution mode episode was started). Note that in some embodiments, processor 102 does not resume execute-ahead mode 604, but instead stalls until another data return occurs (and then starts another deferred-execution mode episode).

Some embodiments also support a scout mode (not shown). If a non-data-dependent stall condition arises during normal-execution mode 602, execute-ahead mode 604, or deferred-execution mode 606, these embodiments can transition to the scout mode to speculatively execute instructions. Scout mode is described in more detail in U.S. Pat. No. 6,415,356, entitled "Method and Apparatus for Using an Assist Processor to Pre-Fetch Data Values for a Primary Processor," by inventors Shailender Chaudhry and Marc Tremblay. Scout mode is also described in U.S. Provisional Application No. 60/436,539, entitled, "Generating Prefetches by Speculatively Executing Code Through Hardware Scout Threading," by inventors Shailender Chaudhry and Marc Tremblay (filed 24 Dec. 2002). Scout mode is additionally described in U.S. Provisional Application No. 60/436,492, entitled, "Performing Hardware Scout Threading in a System that Supports Simultaneous Multithreading," by inventors Shailender Chaudhry and Marc Tremblay (filed 24 Dec. 2002). The above listed references are hereby incorporated by reference herein to provide details on how scout mode operates.

In these embodiments, upon resolving the non-data-dependent stall condition, processor 102 restores the checkpointed architectural state and resumes operation in normal-execution mode 602. Note that restoring the checkpointed architectural state and resuming operation in normal-execution mode 602 involves overwriting or ignoring the speculative results generated during execute-ahead mode 604 and deferred-execution mode 606.

In some embodiments, processor 102 functions differently during execute-ahead mode 604. Specifically, in these embodiments, processor 102 does not defer load instructions that miss in D-cache 306. In these embodiments, processor 102 uses alternative mechanisms to ensure that the data returned for the load miss is properly handled.

In embodiments where the load instruction is not deferred, processor 102 can include one or more mechanisms for mapping each dependent instruction in the deferred queue with a location in the corresponding miss buffer. In these embodiments, even though the load instruction is not deferred and re-executed, when a processor 102 attempts to execute any of the dependent deferred instructions during deferred-execution mode 606 and encounters an unresolved data dependency, processor 102 can use the mapping mechanism to reset the replay bit for the entry in the buffer. For example, the mapping mechanism can use instruction IDs, register IDs, and/or miss queue entries to determine which miss buffer entry is associated with a particular deferred instruction.

Process for Executing Instructions

Figure 7:
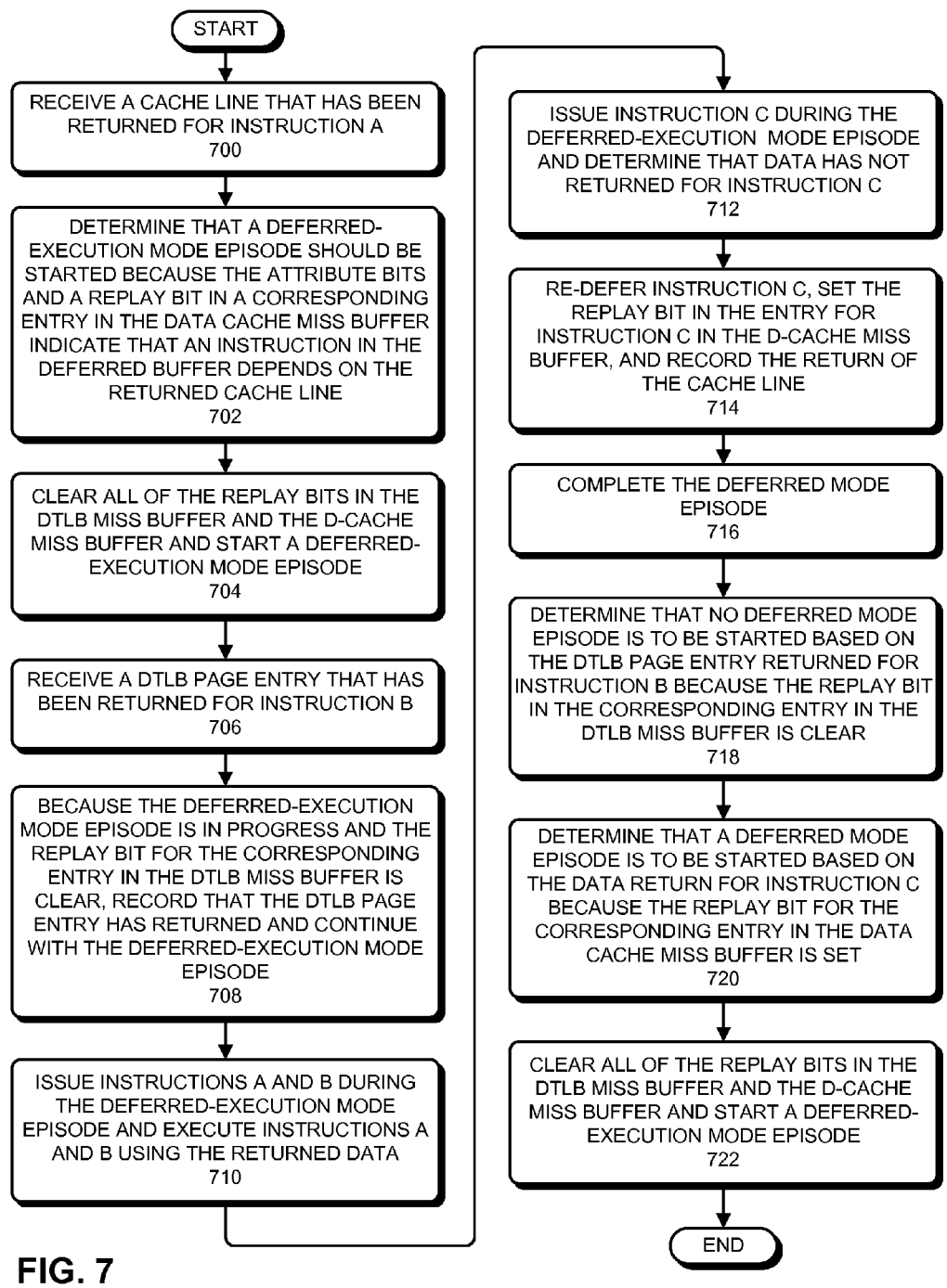
FIG. 7 presents a flowchart illustrating a process for executing instructions in accordance with the described embodiments.

FIG. 7 presents a flowchart illustrating a process for executing instructions in accordance with the described embodiments. More specifically, FIG. 7 presents a flowchart illustrating the execution of instructions A, B, and C. For the example shown in FIG. 7, we assume that:

1. Instructions A and C are load instructions that miss in data cache 306, causing requests to be sent to the memory subsystem.
2. Instruction B is a load instruction for which a DTLB translation request misses in DTLB 304, causing a request to be sent to a higher-level TLB.
3. Processor 102 has deferred all three instructions, recording the miss in a corresponding entry in D-cache miss buffer 310 for instructions A and C and DTLB miss buffer 308 for instruction B, and setting the replay bit in each of the entries.
4. Processor 102 is executing instructions in execute-ahead mode 604.

While executing instructions in execute-ahead mode 604, processor 102 (i.e., load/store execution unit 300, etc.) receives a cache line that has returned for instruction A (step 700). Processor 102 then stores the returned cache line in D-cache 306 and checks the corresponding entry in D-cache miss buffer 310 to determine how to proceed following the return of the data. Because the attribute bits in the corresponding entry in D-cache miss buffer 310 indicate that an instruction in deferred buffer 208 is dependent on the returned data, and because replay bit 506 is set for the entry, processor 102 determines that a deferred-execution mode episode should be started so that instructions in the deferred buffer that are dependent on the returned data can be executed in deferred-execution mode 606 (step 702). Because the data has returned, load/store execution unit 300 also invalidates the entry for the cache line in D-cache miss buffer 310.

Processor 102 then clears the replay bits for all the entries in DTLB miss buffer 308 and D-cache miss buffer 310 and transitions to deferred-execution mode 606 to start a deferred-execution mode episode (step 704). As described above, during the deferred-execution mode episode, processor 102 issues deferred instructions from deferred buffer 208 and attempts to execute the deferred instructions.

While executing instructions in deferred-execution mode 606, but before instruction B is issued from the deferred buffer and executed, load/store execution unit 300 determines that data (a DTLB page entry) has returned for instruction B (step 706). Load/store execution unit 300 then stores the returned page entry in DTLB 304 and checks the corresponding entry in DTLB miss buffer 308 to determine how to handle the return of the data. As with the returned data for instruction A, the attribute bits in the corresponding entry in DTLB miss buffer 308 indicate that an instruction in deferred buffer 208 is dependent on the returned data. However, unlike the data return for instruction A, the replay bit for the entry in DTLB miss buffer 308 is cleared. Processor 102 then determines that a deferred-execution mode episode (i.e., the deferred-execution mode episode triggered by the data return for instruction A) is in progress. Because the deferred-execution mode episode is in progress, processor 102 records the return of the DTLB page entry for instruction B and continues with the deferred-execution mode episode (step 708).

Because the DTLB page entry has returned for instruction B, when processor 102 issues instructions A and B from deferred buffer 208 during the deferred-execution mode episode, they can be executed (step 710). However, when processor 102 issues instruction C from deferred buffer 208 and attempts to execute instruction C, processor 102 again encounters the unresolved data dependency for which instruction C was originally deferred (step 712). Because the data dependency for instruction C has not yet been resolved, processor 102 re-defers instruction C, sets the replay bit in the corresponding entry in D-cache miss buffer 310, and records the return of the cache line for instruction C (step 714). By setting the replay bit for instruction C, processor 102 records that at least one instruction dependent on the data has been re-deferred, and hence a subsequent deferred-execution mode episode should be undertaken when the data returns so that the deferred instruction can be executed.

Processor 102 then completes the deferred-execution mode episode (step 716). As described above, completing the deferred-execution mode episode involves completing a pass through deferred buffer 208, attempting to execute each of the deferred instructions, and re-deferring instructions that cannot be executed due to an unresolved data dependency.

Processor 102 next determines that no deferred-execution mode episode is to be started based on the DTLB page entry return for instruction B (as recorded in step 708) because the replay bit in the corresponding entry in DTLB miss buffer 308 is clear (step 718).

If there were no further instructions in the deferred queue, processor 102 could then return to normal-execution mode 602. However, because instruction C was re-deferred during deferred-execution mode 606 (as recorded in step 714), processor 102 determines that a deferred-execution mode episode is to be started based on the cache line returned for instruction C and because the replay bit for the corresponding entry in D-cache miss buffer 310 is set (step 720). Processor 102 then clears the replay bits for all the entries in DTLB miss buffer 308 and D-cache miss buffer 310 and transitions to deferred-execution mode 606 to start a deferred-execution mode episode (step 722).

As described above, if the pass through deferred buffer 208 in deferred-execution mode 606 is completed without additional instructions being deferred, processor 102 determines that deferred buffer 208 is empty and returns to normal-execution mode 602. Otherwise, processor 102 continues in execute-ahead mode 604 from the point where execute-ahead mode left off when the deferred-execution mode episode was started. Note that in some embodiments, processor 102 does not resume execute-ahead mode 604, but instead stalls until another data return occurs (and then starts another deferred-execution mode episode).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for executing instructions in a processor, comprising:
   upon detecting a return of input data for a deferred instruction while executing instructions in an execute-ahead mode in the processor,
   determining if a replay bit is set in a corresponding entry for the returned input data in a miss buffer or another miss data structure, wherein the replay bit is set upon determining an unresolved data dependency for the deferred instruction while executing instructions in the execute-ahead mode;
   if the replay bit is set, transitioning from the execute-ahead mode to a deferred-execution mode to execute deferred instructions; and
   otherwise, continuing to execute instructions in the execute-ahead mode.

2. The method of claim 1, wherein executing instructions in the execute-ahead mode involves:
   placing instructions that cannot be executed due to an unresolved data dependency into a deferred buffer, thereby deferring the instructions; and
   executing other non-deferred instructions in program order.

3. The method of claim 2, wherein deferring an instruction for which a memory access is used to resolve the unresolved data dependency and for which a record of the memory access is kept in the miss buffer involves:
   sending a request to a memory system for the data to resolve the unresolved data dependency;
   recording the request in a corresponding entry in the miss buffer; and
   setting a replay bit in the entry in the miss buffer.

4. The method of claim 2, wherein executing instructions in the deferred-execution mode involves:
   issuing deferred instructions from the deferred buffer for execution in program order,
   placing deferred instructions that still cannot be executed due to an unresolved data dependency back into the deferred buffer, thereby re-deferring the instructions; and
   executing other deferred instructions in program order.

5. The method of claim 4, wherein the method further comprises clearing the replay bit for each entry in the miss buffer and other miss data structures when transitioning to the deferred-execution mode.

6. The method of claim 5, wherein for re-deferred instructions with a corresponding entry in the miss buffer or another miss data structure, re-deferring the instructions involves setting a replay bit in the entry in the miss buffer or the other miss data structure.

7. The method of claim 1, wherein the miss buffer and the other miss data structure include fields to keep records of outstanding requests for data following corresponding misses.

8. The method of claim 1, wherein at least one of the miss buffer and the other miss data structure comprise a lookup structure for translating virtual addresses for cache lines of data to physical addresses and a cache memory that stores cache lines containing data.

9. The method of claim 1, wherein the corresponding entry comprises a memory address corresponding to a memory location where the returned input data is stored.

10. The method of claim 1, further comprising:
deferring an instruction upon determining the unresolved data dependency for the instruction while executing instructions in the execute-ahead mode, wherein deferring the instruction comprises placing the deferred instruction into a deferred buffered and setting the replay bit in the corresponding entry in the miss buffer or the other data structure.

11. A processor that executes instructions, comprising:
a miss buffer in the processor;
wherein upon detecting a return of input data for a deferred instruction while executing instructions in an execute-ahead mode, the processor is configured to:
determine if a replay bit is set in a corresponding entry for the returned input data in the miss buffer or another miss data structure, wherein the replay bit is set upon determining an unresolved data dependency for the deferred instruction while executing instructions in the execute-ahead mode;
if the replay bit is set, transition from the execute-ahead mode to a deferred-execution mode to execute deferred instructions; and
otherwise, continue to execute instructions in the execute-ahead mode.

12. The processor of claim 11, wherein when executing instructions in the execute-ahead mode, the processor is configured to:
place instructions that cannot be executed due to an unresolved data dependency into a deferred buffer, thereby deferring the instructions; and
execute other non-deferred instructions in program order.

13. The processor of claim 12, wherein when deferring an instruction for which a memory access is used to resolve the unresolved data dependency and for which a record of the memory access is kept in the miss buffer, the processor is configured to:
send a request to a memory system for the data to resolve the unresolved data dependency;
record the request in a corresponding entry in the miss buffer; and
set a replay bit in the entry in the miss buffer.

14. The processor of claim 12, wherein when executing instructions in the deferred-execution mode, the processor is configured to:
issue deferred instructions from the deferred buffer for execution in program order,
place deferred instructions that still cannot be executed due to an unresolved data dependency back into the deferred buffer, thereby re-deferring the instructions; and
execute other deferred instructions in program order.

15. The processor of claim 14, wherein the processor is configured to clear the replay bit for each entry in the miss buffer and other miss data structures when transitioning to the deferred-execution mode.

16. The processor of claim 15, wherein for re-deferred instructions with a corresponding entry in the miss buffer or another miss data structure, when re-deferring the instructions, the processor is configured to set a replay bit in the entry in the miss buffer or the other miss data structure.

17. The processor of claim 11, wherein the miss buffer is a cache miss buffer and the input data is a cache line; and
wherein when determining if the replay bit is set, the processor is configured to check the cache miss buffer to determine whether the replay bit is set for a corresponding entry for a cache line request in the cache miss buffer.

18. The processor of claim 11, wherein the miss buffer is a data translation lookaside buffer (DTLB) miss buffer and the input data is a page entry; and
wherein when determining if the replay bit is set, the processor is configured to check the DTLB miss buffer to determine whether the replay bit is set for a corresponding entry for a page entry request in the DTLB miss buffer.

19. A computer system for executing instructions, comprising:
a processor;
a miss buffer in the processor; and
a memory coupled to the processor that stores data and instructions for the processor;
wherein upon detecting a return of input data for a deferred instruction while executing instructions in an execute-ahead mode, the processor is configured to:
determine whether a replay bit is set in a corresponding entry for the returned input data in the miss buffer or another miss data structure, wherein the replay bit is set upon determining an unresolved data dependency for the deferred instruction while executing instructions in the execute-ahead mode;
if the replay bit is set, transition from the execute-ahead mode to a deferred-execution mode to execute deferred instructions; and
otherwise, continue to execute instructions in the execute-ahead mode.

20. The computer system of claim 19, wherein when executing instructions in the execute-ahead mode, the processor is configured to:
place instructions that cannot be executed due to an unresolved data dependency into a deferred buffer, thereby deferring the instructions; and
execute other non-deferred instructions in program order.

* * * * *